Jan. 21, 1969  P. L. POWELL  3,422,685

SPEEDOMETER

Filed Jan. 20, 1966

INVENTOR
Patrick L. Powell.

By Norton Lesser
Attorney

United States Patent Office 3,422,685
Patented Jan. 21, 1969

3,422,685
SPEEDOMETER
Patrick L. Powell, Franklin Park, Ill., assignor to Stewart-Warner Corporation, Chicago, Ill., a corporation of Virginia
Filed Jan. 20, 1966, Ser. No. 521,787
U.S. Cl. 73—519                                    1 Claim
Int. Cl. G01p 3/22

ABSTRACT OF THE DISCLOSURE

The following specification describes a speedometer in which the pointer shaft is journaled independently of the magnet shaft in two spaced plastic bearings. One bearing fits a groove in the shaft to restrain axial movement of the pointer shaft and the other bearing is formed in a plastic support having an axially extending wall intermediate the axis of the pointer and the speed cup rim to rigidify the plastic together with an integrally formed stop adjacent the pointer shaft axis for cooperation with an ear on the speed cup.

---

The present invention relates generally to a speedometer of the magnetic type and more particularly to support means for the indicator spindle thereof.

In general, a magnetic type speedometer comprises a rotatable permanent magnet. Encircling the magnet is a speed cup secured to a rotatably mounted indicator spindle that carries an indicating pointer. As the magnet revolves within the speed cup, it sets up a rotating magnetic field which exerts a pull or magnetic drag on the speed cup, making it revolve in the same direction. The speed cup rotates to a point where the magnetic drag is just balanced by the retarding force created by a hair spring attached to the indicator spindle. The amount of speed cup deflection is proportional to the speed at which the magnet is being revolved. Heretofore, the end of the indicator spindle adjacent the speed cup has been rotatably supported in a bearing mounted in the adjacent end of the magnet shaft. This arrangement has proved disadvantageous, first, because undesirable vibrations are transmitted from the magnet shaft to the indicator spindle, and, secondly, because objectionable wear occurs at the bearing in the magnet shaft.

It is a primary object of the present invention to provide a speedometer indicator spindle with support means that is independent of the magnet shaft whereby to eliminate the afore-noted disadvantages of prior indicator spindle mountings.

It is another object of the present invention to provide support means, as described, which includes a novel form of bearing cap that affords both an axial thrust and a radial bearing support for the indicator spindle.

It is a feature of the present invention that the bearing cap is fabricated of plastic and is adapted to be snapped into engagement with the indicator spindle.

Now in order to acquaint those skilled in the art with the manner of constructing and using speedometers incorporating the principles of the present invention, there will be described in connection with the accompanying drawing a preferred embodiment of the invention.

Figure 1:
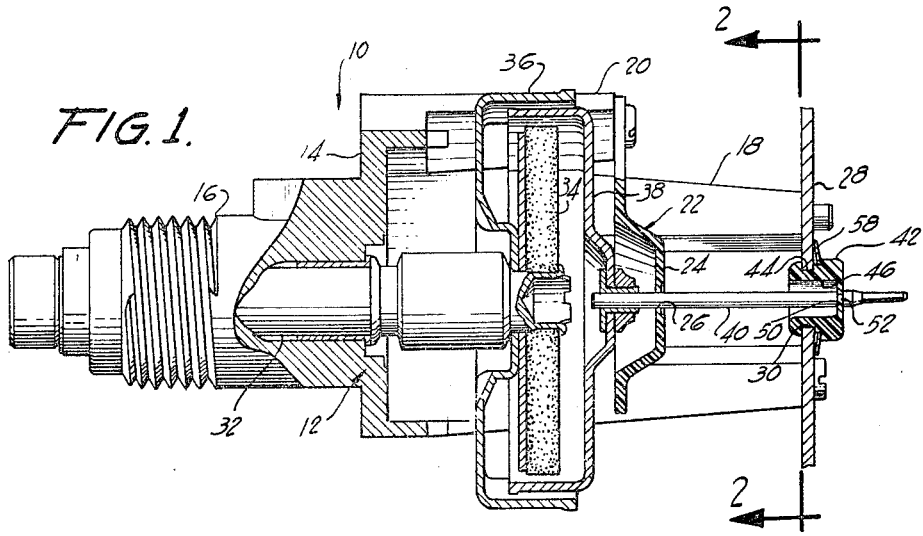
FIGURE 1 is a longitudinal median sectional view of a speedometer incorporating the principles of the present invention.

Referring now to the drawing, there is indicated generally by the reference numeral 10 a speedometer comprising a main frame 12 having a transverse wall portion 14, and axially extending tubular portion 16, laterally spaced axially extending side arm portions 18, and spaced axially extending post portions 20. Suitably secured as by screws to the post portions 20 is a first plastic support member or bearing bracket 22 which includes an axially offset central portion 24 having an aperture 26 therein. Suitably secured to the ends of the side arm portions 18 as by screws is a second support member or bracket 28 having a central opening 30 therein. The main frame 12 and the first and second support members 22 and 28 define frame means for the speedometer 10.

Rotatably mounted in the tubular portion 16 of the main frame 12 is a magnet shaft 32. The outer end of the magnet shaft 32 is adapted to be connected, for example, to a vehicle transmission through a flexible shaft (not shown). The inner end of the magnet shaft 32 has secured thereon a transverse bar magnet 34 and a generally C-shaped field plate 36.

Encircling the bar magnet 34 within the boundary of the field plate 36 is a speed cup 38 which is fabricated of a non-magnetic material such as aluminum, and which is secured to the inner end of an indicator spindle 40. Adjacent one end the indicator spindle 40 is rotatably mounted in the aperture 26 of the first support member 22, and adjacent its other end is rotatably mounted in bearing means 42 disposed in the opening 30 of the second support member 28. The bearing means 42, which is fabricated of plastic, is in the form of a bearing cap having a stepped outer periphery and an outwardly flared inner edge that define an annular channel 44 which engages the edges of the opening 30 in the second support member 28 for securing the bearing cap 42 in position. Also, the bearing cap 42 has an axial bore 46 and a radially inwardly directed ring flange portion 48 with a central axial aperture 50. The indicator spindle 40 adjacent the bearing cap 42 is formed with an annular groove 52 that receives by snap-in engagement the edges of the aperture 50 in the bearing cap flange 48. The interengagement of the spindle groove 52 and bearing cap flange 48 axially locates the indicator spindle 40, and provides an axial thrust and radial bearing support for the spindle.

Figure 4:
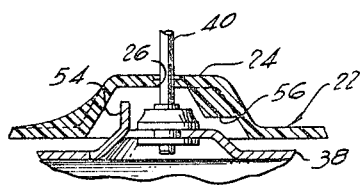
FIGURE 4 is a fragmetary sectional view corresponding to a portion of FIGURE 1 and showing the stop means arranged between the speed cup and the adjacent support member.
Figure 3:
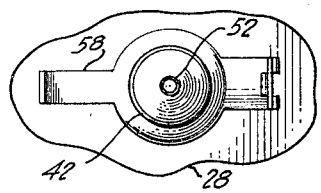
FIGURE 3 is a fragmetary transverse view, taken substantially along the line 3—3 in FIGURE 1, looking in the direction indicated by the arrows.
Figure 2:
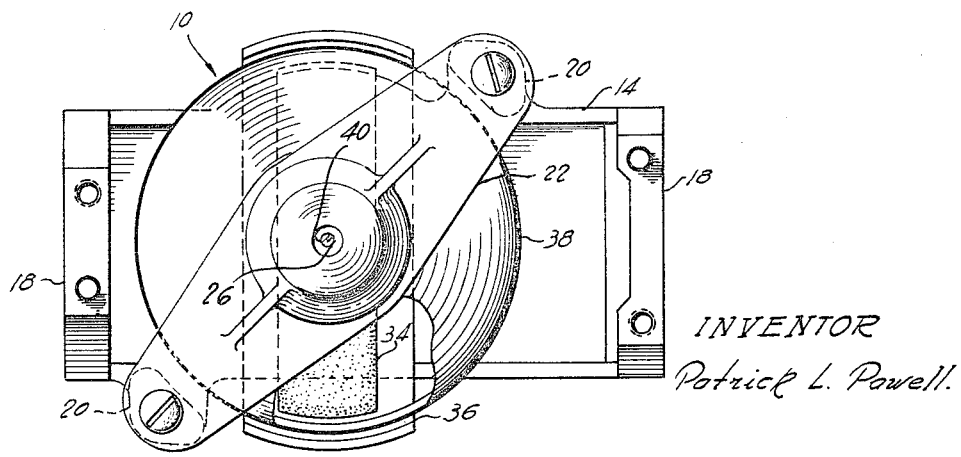
FIGURE 2 is a transverse view, taken substantially along the line 2—2 in FIGURE 1, looking in the direction indicated by the arrows.

As shown in FIGURES 1 and 3, a strip member 58 is interposed between the second support member 28 and the bearing cap 42. In a conventional manner, a spiral hair spring (not shown) is connected at one end to the strip member 58 and at the other end to the indicator spindle 40, while an indicating pointer (not shown) is secured to the outer end of the spindle. During rotation of the magnet shaft 32 and magnet 34, a magnetic field is set up which exerts a pull or magnetic drag on the speed cup 38 causing it to revolve in the same direction. The movement of the speed cup is retarded and held steady by the hair spring. The speed cup rotates to a point where magnetic drag is balanced by the retarding force exerted by the hair spring. When rotation of the magnet 34 stops, the speed cup is returned to its rest position by the hair spring. As shown in FIGURE 4, the speed cup 38 is provided with an axial outturned ear portion 54 that is engageable with the axial web portion 56 of the first support member 22. The elements 54 and 56 serve as cooperating stop means for establishing the rest position of the speed cup.

In accordance with the principles of the present invention, the adjacent ends of the coaxial indicator spindle 40 and the magnet shaft 32 are maintained in separated relation, and the indicator spindle 40 is supported independently of the magnet shaft 32. As a result, the transmission of vibrations from the magnet shaft to the indicator spindle is eliminated. Also, the independent mounting of the indicator spindle eliminates bearing wear that occurs in existing speedometers where the indicator spindle is rotatably mounted at one end in the adjacent end of the magnet shaft. Still further, the snap-in bearing cap 42 facilitates quick and accurate assembly of the indicator spindle 40 in the bearing cap.

While there has been shown and described a preferred embodiment of the present invention, it will be understood by those skilled in the art that various rearrangements and modifications may be made therein without departing from the spirit and scope of the invention.

I claim:

1. A speedometer comprising a frame having a tubular portion at one end and a pair of spaced arms extending therefrom, a support member mounted on said pair of spaced arms at the end opposite said tubular portion, a magnet shaft rotatably supported in said tubular portion, a magnet secured to one end of said magnet shaft between said tubular portion and support member, said support member having an opening coaxial with said magnet shaft, a plastic annular bearing cap having a radially inwardly directed ring flange defining a central aperture coaxial with said shaft and an annular channel in the outer surface of said cap for engaging the edge of said coaxial support member opening to secure said cap in said opening, an indicator spindle having an annular groove adjacent one end of said spindle with said groove engaged in said ring flange central aperture whereby one rotatable bearing support is provided for said spindle, the ends of said groove engaging opposite surfaces of said ring flange for limiting axial movement of said spindle, a strip member having an opening encircling said cap and frictionally engaging against both one side of said support member and said bearing cap for rotation about the axis of said spindle, a spring for biasing said indicator spindle in one direction and having one end connected to said spindle and the other end connected to said strip whereby rotation of said strip about said spindle alters the bias of said spring, a pair of spaced posts integrally formed on said frame and extending in the direction of said arms, a generally planar plastic second support member extending radially of said spindle between said posts and having an axially offset radial wall between said first support and said magnet with an aperture therein coaxial with said magnet shaft and indicator spindle for rotatably supporting said indicator spindle at a position adjacent said magnet, an axially extending wall on said second support member extending between the periphery of said radial wall and said generally planar support member intermediate said indicator spindle axis and the outer boundary of said magnet and integrally formed with said planar member and radial wall for stiffening said generally planar member and radial wall against axial movement, a pair of radially and axially extending integrally formed ribs between said axially extending wall and said generally planar support member, a speed cup carried by said spindle between said second support and said magnet and coaxial with said magnet for rotating said indicator shaft in response to rotation of said magnet, a pointer carried at said one end of said indicator shaft adjacent said first support member for indicating the angular position of said indicator spindle and speed cup, an ear portion formed on said speed cup adjacent the axis of said indicator spindle and within the confines of said axially extending wall, and a cooperating stop integrally formed on said second support member axially extending adjacent the juncture of said radial and axial walls for cooperation with said speed cup ear to limit the rotation of said indicator shaft under the influence of said spring and facilitate separation therebetween in response to a small torque on said speed cup introduced on initiation of rotation of said magnet.

References Cited

UNITED STATES PATENTS

| | | | |
|---|---|---|---|
| 2,246,366 | 6/1941 | Kollsman | 73—519 XR |
| 2,855,887 | 10/1958 | Mumford et al. | 73—519 XR |
| 2,953,026 | 9/1960 | Sivacek | 73—519 |
| 3,240,072 | 3/1966 | Holbrook | 73—519 XR |

JAMES J. GILL, *Primary Examiner.*